(12) United States Patent
Venkatesan

(10) Patent No.: US 11,750,928 B2
(45) Date of Patent: Sep. 5, 2023

(54) METHOD AND ELECTRONIC DEVICE FOR RECTIFYING AN IMAGE

(71) Applicant: SAMSUNG ELECTRONICS CO., LTD., Suwon-si (KR)

(72) Inventor: Shankar Mosur Venkatesan, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/727,460

(22) Filed: Apr. 22, 2022

(65) Prior Publication Data

US 2022/0394181 A1 Dec. 8, 2022

Related U.S. Application Data

(63) Continuation of application No. PCT/KR2022/004476, filed on Mar. 30, 2022.

(30) Foreign Application Priority Data

Jun. 3, 2021 (IN) .............................. 202141024822
Nov. 2, 2021 (IN) .............................. 202141024822

(51) Int. Cl.
*H04N 5/335* (2011.01)
*H04N 23/68* (2023.01)
(Continued)

(52) U.S. Cl.
CPC ......... *H04N 23/6842* (2023.01); *H04N 23/45* (2023.01); *H04N 23/69* (2023.01)

(58) Field of Classification Search
CPC ................................................ H04N 23/6842
See application file for complete search history.

(56) References Cited

U.S. PATENT DOCUMENTS 9,813,615 B2 11/2017 Lee et al.
11,128,803 B2 9/2021 Joo et al.
(Continued)

FOREIGN PATENT DOCUMENTS

KR 10-2016-0012743 A 2/2016
KR 10-2017-0136828 A 12/2017
(Continued)

OTHER PUBLICATIONS

"Optical Image Stabilization (OIS)", Innovations Embedded, Rohm Semiconductor, 2017. (13 pages total).
(Continued)

*Primary Examiner* — Gary C Vieaux
(74) *Attorney, Agent, or Firm* — Sughrue Mion, PLLC

(57) ABSTRACT

Provided is method for rectifying an image using an electronic device. The method includes simultaneously capturing a first image of a scene using a first image sensor and a second image of the scene using a second image sensor, a first field of view (FOV) of the first image sensor being different from a second FOV of the second image sensor; identifying a motion characteristic in the first image; determining a motion function based on one of the first image and a capture process of the first image that caused the motion characteristic in the first image; scaling the motion function from the first image by a scale of the first image sensor with respect to the second image sensor; and applying the scaled motion function onto the second FOV of the second image to obtain a rectified second image without the motion characteristic.

20 Claims, 9 Drawing Sheets

(51) Int. Cl.
    *H04N 23/45* (2023.01)
    *H04N 23/69* (2023.01)

(56) References Cited

U.S. PATENT DOCUMENTS

| | | |
|---|---|---|
| 2004/0227851 A1 | 11/2004 | Min |
| 2013/0107064 A1 | 5/2013 | Venkatraman et al. |
| 2013/0242059 A1 | 9/2013 | Dahi et al. |
| 2015/0130954 A1 | 5/2015 | Hyun et al. |
| 2019/0289321 A1 | 9/2019 | Liu et al. |
| 2020/0267320 A1 | 8/2020 | Song et al. |

FOREIGN PATENT DOCUMENTS

| | | | |
|---|---|---|---|
| KR | 10-2019-0032061 A | 3/2019 | |
| WO | WO-2017209509 A1 * | 12/2017 | ......... H04N 5/23232 |
| WO | 2021/019318 A1 | 2/2021 | |

OTHER PUBLICATIONS

Steiner, Shawn C., "Image Stabilization: When to Use it and When to Turn it Off", https://www.bhphotovideo.com/explora/photography/tips-and-solutions/image-stabilization-when-use-it-and-when-turn-it-off, May 18, 2015. (6 pages trotal).
Das, Rajshekhar et al., "Fast Non-blind Image Deblurring with Sparse Priors", Proceedings of International Conference on Computer Vision and Image Processing, pp. 629-641, First Online: Dec. 23, 2016, https://link.springer.com/chapter/10.1007/978-981-10-2104-6_56, Part of the Advances in Intelligent Systems and Computing book series (AISC, vol. 459).
Yuan, Lu et al., "Image Deblurring with Blurred/Noisy Image Pairs", 2007. (10 pages total).
Hansen, Christian et al., "Deblurring Images: Matrices, Spectra, and Filtering", Fundamentals of Algorithms, Society for Industrial and Applied Mathematics, 2006. (145 pages total).
Ben-Ezra, Moshe et al., "Motion-Based Motion Deblurring", IEEE Transactions on Pattern Analysis and Machine Intelligence, vol. 26, No. 6, Jun. 2004, pp. 689-698. (10 pages total).
Buades, Antoni et al., "A non-local algorithm for image denoising", 2005. (6 pages total).
Tai, Yu-Wing et al., "Richardson-Lucy Deblurring for Scenes under Projective Motion Path", 2010. (13 pages total).
Tai, Yu-Wing et al., "Correction of Spatially Varying Image and Video Motion Blur using a Hybrid Camera", Apr. 8, 2009. (34 pages total).
Gong, Dong et al., "From Motion Blur to Motion Flow: a Deep Learning Solution for Removing Heterogeneous Motion Blur", https://donggong1.github.io/blur2mflow, 2017. (10 pages total).
Li, Feng et al., "A Hybrid Camera for Motion Deblurring and Depth Map Super-Resolution", 2008. (8 pages total).
Fu, Zhichao et al., "Edge-Aware Deep Image Deblurring", arXiv:1907.02282v2 [cs.CV], Jul. 11, 2020. (9 pages total).
"Awesome-Deblurring" https://github.com/subeeshvasu/Awesome-Deblurring, Mar. 2020. (17 pages total).
Zhang, Xinyi et al., "Gated Fusion Network for Joint Image Deblurring and Super-Resolution", 2018. (13 pages total).
Chen, Jia et al., "Robust Dual Motion Deblurring", 2008. (8 pages total).
Rav-Acha, Alex et al., "Two motion-blurred images are better than one", Pattern Recognition Letters, vol. 26, 2005, pp. 311-317. (7 pages total).
Levin, Anat, "Blind Motion Deblurring Using Image Statistics", 2006. (8 pages total).
Lucas, Bruce D. et al., "An Iterative Image Registration Technique with an Application to Stereo Vision", Pro 7th Intl Joint Conf on Artifficial Intelligence (IJCAI), Aug. 24-28, 1981, Vancouver, British Columbia, pp. 674-679. (6 pages total).
Liu, Xinqiao et al., "Simultaneous Image Formation and Motion Blur Restoration via Multiple Capture", 2001. (4 pages total).
Ito, Atsushi et al., "BlurBurst: Removing Blur Due to Camera Shake using Mutliple Images", ACM Transactions on Graphics, vol. VV, No. N, Article XXX, Jun. 2014. (15 pages total).
Hirsch, Michael et al., "Self-calibration on optical lenses", 2015. (9 pages total).
International Search Report and Written Opinion dated Jun. 30, 2022 by the International Searching Authority in International Application No. PCT/KR2022/004476. (PCT/ISA/220, PCT/ISA/210 and PCT/ISA/237).

* cited by examiner

METHOD AND ELECTRONIC DEVICE FOR RECTIFYING AN IMAGE

CROSS-REFERENCE TO RELATED APPLICATIONS

This application is a continuation of International Application No. PCT/KR2022/004476 designating the United States, filed on Mar. 30, 2022, in the Korean Intellectual Property Receiving Office and claiming priority to Indian Provisional Patent Application No. 202141024822, filed on Jun. 3, 2021, and Indian Patent Application No. 202141024822, filed on Nov. 2, 2021, the disclosures of which are incorporated by reference herein in their entireties.

BACKGROUND

1. Field

The disclosure relates to image processing. and more specifically, to a method and an electronic device for rectifying an image by removing a motion characteristic such as image motion blur caused by a motion function such as image-motion-trajectory.

2. Description of Related Art

In general, camera image blurring due to motion functions, such as, for example, shake in an electronic device and motion of a target, is a very common issue which degrades user experience. Many signal processing filters and algebra-based deblurring methods have been used to address the issues arising out of the motion functions. Normal and low-light photography in electronic devices comprising Optical Image Stabilization (OIS) suffer image blurring due to camera shakes. For example, the OIS is not precise enough to compensate for very small shakes or very large shakes.

Further, telephoto imaging generally suffers much more from image shakes than a wide-angle or ultrawide-angle imaging, even when the cameras undergo a same physical motion. This is because a field of view (FOV) of a telephoto lens (e.g., 23° (degrees), approximately 16 mega-pixels (MP)) is much smaller than the FOV of a wide-angle lens (e.g., 77°, approximately 12 MP, OIS), and the FOV of an ultrawide-angle lens (e.g., 123°, approximately 12 MP). Thus, for example, a shake of 0.5 to 1° may translate into a 30 to 60 pixel motion for the wide-angle lens, a 100 to 150 pixel motion for the telephoto lens, and 10 to 30 pixel motion for the ultrawide-angle lens. In some scenarios, the situation may be worsened with longer and/or low exposure shots or night shots. For example, a common and almost imperceptible, undetectable, and uncorrectable shake of approximately 0.1° in the wide-angle lens case may translate to a 3 to 5 pixel blur. Even such a tiny 4-pixel blur in the wide-angle lens scenario may reduce the effective sharpness of an image down from 48 MP to approximately 12 MP, which hampers user experience.

Related art techniques may be used to compute an image blur kernel (e.g., where the image trajectory is affected due to a shake drawn in a K×K rectangle) that can used to produce a deblurred image from an input of a blurred image. Typically, shakes that include sudden turns, jumps, and/or complex irregular shapes like the letter "W", may be difficult to detect and/or to remove using related art methods such as OIS. As a result, the images captured during the shake may not be able to capture a scene in the best possible way.

Thus, there is a need to address the above mentioned disadvantages or other shortcomings or at least provide a useful alternative.

SUMMARY

Provided are a method and an electronic device for rectifying an image by eliminating motion characteristics, such as, for example, image motion blur caused by a motion function such as image-motion-trajectory. The image may be rectified by using images simultaneously captured by multiple image sensors of the electronic device.

One or more embodiments presented herein provide for the use of multiple image sensors with different field of views (FOVs). As such, an image sensor, which generates a sharper image due to a FOV, is used to rectify the image generated by another image sensor with a different FOV. A motion kernel obtained for the sharper image is scaled and applied to the image generated by the another image sensor to rectify the image.

According to an aspect of the disclosure, there is provided a method for rectifying an image using an electronic device, the method including: simultaneously capturing, by the electronic device, at least one first image of a scene using a first image sensor of a plurality of image sensors and at least one second image of the scene using a second image sensor of the plurality of image sensors, a first field of view (FOV) of the first image sensor being different from a second FOV of the second image sensor; identifying, by the electronic device, a motion characteristic in the at least one first image; determining, by the electronic device, a motion function based on one of the at least one first image and a capture process of the at least one first image that caused the motion characteristic in the at least one first image; scaling, by the electronic device, the motion function from the at least one first image by a scale of the first image sensor with respect to the second image sensor; and applying, by the electronic device, the scaled motion function onto the second FOV of the at least one second image to obtain at least one rectified second image without the motion characteristic.

The first image sensor may be a telephoto sensor, the second image sensor may be a non-telephoto sensor, the first FOV of the telephoto sensor is smaller than the second FOV of the non-telephoto sensor, the at least one first image may include at least one telephoto image, the at least one second image may include at least one non-telephoto image, the simultaneously capturing the at least one first image and the at least one second image may include preventing, by the electronic device, on-device optical image stabilization (OIS) associated with the telephoto sensor and the non-telephoto sensor during the simultaneously capturing of the at least one telephoto image and the at least one non-telephoto image, and the scaling the motion function may include: determining, by the electronic device, that the motion characteristic in the at least one non-telephoto image is less than a motion threshold based on a size of the motion characteristic in the at least one telephoto image; determining, by the electronic device, that a first scale of the telephoto sensor with respect to the non-telephoto sensor is a downsizing scale, the first scale being a ratio of the first FOV of the telephoto sensor to the second FOV of the non-telephoto sensor, and the downsizing scale corresponding to the first scale having a value that is less than 1; and downsizing, by the electronic device, the motion function of the at least one telephoto image by the first scale, based on determining that the first scale is the downsizing scale.

The motion characteristic may be an image-motion-blur originating from at least one of a common shake of the electronic device, a common local motion in the scene, and a common global motion in the scene, and the motion function may be an image-motion-trajectory.

The method may further include: determining, by the electronic device, at least one individual object of a plurality of objects independently moving with respect to the scene in the first FOV of the telephoto sensor; determining, by the electronic device, a local motion trajectory for each object of the plurality of objects in the at least one telephoto image; downsizing, by the electronic device, the local motion trajectory of each object by the first scale, wherein the first scale is a telephoto factor; and deblurring, by the electronic device, another at least one individual object in the at least one non-telephoto image corresponding to the at least one individual object of the plurality of objects in the at least one telephoto image.

The first image sensor may be a non-telephoto sensor, the second image sensor may be a telephoto sensor, the first FOV of the non-telephoto sensor may be greater than the second FOV of the telephoto sensor, the at least one first image may include at least one non-telephoto image, the at least one second image may include at least one telephoto image, the simultaneously capturing the at least one first image and the at least one second image may include preventing, by the electronic device, on-device optical image stabilization (OIS) associated with the telephoto sensor and the non-telephoto sensor during the simultaneously capturing of the at least one telephoto image and the at least one non-telephoto image, and the scaling the motion function may include: determining, by the electronic device, that the motion characteristic in the at least one telephoto image is greater than or equal to a motion threshold based on a size of the motion characteristic in the at least one non-telephoto image; estimating, by the electronic device, the motion function in a certain FOV of the at least one non-telephoto image; determining, by the electronic device, that a first scale of the non-telephoto sensor with respect to the telephoto sensor is an upsizing scale, the first scale being a ratio of the first FOV of the non-telephoto sensor to the second FOV of the telephoto sensor, and the upsizing scale corresponding to the first scale having a value that is greater than 1; and upsizing, by the electronic device, the motion function of the at least one non-telephoto image by the first scale, based on a determination that the first scale is the upsizing scale.

The motion characteristic may be an image-motion-blur which originates from a common shake of the electronic device, and the motion function may be an image-motion-trajectory which arises from a real common motion trajectory of the electronic device due to a shake.

The applying the scaled motion function onto the second FOV of the at least one second image may include: determining, by the electronic device, a real angular motion function of the electronic device from an inertial mechanism in a first optical image stabilization (OIS) device associated with the first image sensor; determining, by the electronic device based on the real angular motion function, a real motion function for the second image sensor, wherein the second image sensor does not include a second OIS device; and applying, by the electronic device, the determined real motion function to the at least one second image to obtain the at least one rectified second image.

The motion characteristic may be a motion between two successive video frames, the motion function may be a dense-optical-flow, and the applying the scaled motion function onto the second FOV of the at least one second image may include stabilizing a portion of the second FOV of the at least one non-telephoto image which is common to the first FOV of the at least one telephoto image by applying a downsized dense-optical-flow to the at least one non-telephoto image.

The motion characteristic may be an object boundary, the motion function may be an object segmentation, and the applying the scaled motion function onto the second FOV of the at least one second image may include applying a downsized object segmentation from the at least one telephoto image to the at least one non-telephoto image to enhance pixel-level segmentation of a corresponding small object in the at least one non-telephoto image.

The method may further include: panning, by the electronic device, the first image sensor and the second image sensor together across the scene; determining, by the electronic device, a plurality of objects that enter and exit the first FOV of the telephoto sensor; individually detecting and segmenting, by the electronic device, each object of the plurality of objects that enters the first FOV of the telephoto sensor prior to a particular object exiting the first FOV of the telephoto sensor in the at least one telephoto image; downsizing, by the electronic device, segmentations of the individually segmented plurality of objects in the at least one telephoto image by the first scale of the telephoto sensor with respect to the non-telephoto sensor; and applying, by the electronic device, each of the downsized segmentations to corresponding objects in the at least one non-telephoto image that correspond to the plurality of objects in the at least one telephoto image.

The motion characteristic may be curving and branching of an object in the at least one telephoto image, the motion function may be a second or higher derivative, and the applying the scaled motion function onto the second FOV of the at least one second image may include applying a downsized second or higher derivative to the at least one non-telephoto image to calculate a segmentation of a corresponding object in the at least one non-telephoto image that corresponds to the object in the at least one telephoto image.

The motion characteristic may be an obstruction in the at least one telephoto image, the motion function may be a segmentation of the obstruction, and the applying the scaled motion function onto the second FOV of the at least one second image may include applying a downsized segmentation to the at least one non-telephoto image to identify and remove a corresponding obstruction in the at least one non-telephoto image that corresponds to the obstruction in the at least one telephoto image.

The simultaneously capturing the at least one first image and the at least one second image may include: simultaneously switching on, by the electronic device, the first image sensor and the second image sensor of the electronic device for a specific duration of time; and simultaneously capturing, during the specific duration of time, by the electronic device, the at least one first image of the scene using the first image sensor and the at least one second image of the scene using the second image sensor.

According to an aspect of the disclosure, there is provided an electronic device for rectifying an image, the electronic device including: a plurality of image sensors; a processor configured to: control a first image sensor and a second image sensor of the plurality of image sensors to simultaneously capture at least one first image of a scene using the first image sensor and at least one second image of the scene using the second image sensor, wherein a first field of view (FOV) of the first image sensor may be different from a second FOV of the second image sensor; and an image rectification controller configured to: identify a motion characteristic in the at least one first image; determine a motion function based on one of the at least one first image and a capture process of the at least one first image that caused the motion characteristic in the at least one first image; scale the motion function from the at least one first image by a scale of the first image sensor with respect to the second image sensor; and apply the scaled motion function onto the second FOV of the at least one second image to obtain at least one rectified second image without the motion characteristic.

The first image sensor may be a telephoto sensor; the second image sensor may be a non-telephoto sensor; the first FOV of the telephoto sensor may be smaller than the second FOV of the non-telephoto sensor; the at least one first image may include at least one telephoto image; the at least one second image may include at least one non-telephoto image; and the image rectification controller may be further configured to: determine that the motion characteristic in the at least one non-telephoto image is less than a motion threshold based on a size of the motion characteristic in the at least one telephoto image; prevent on-device optical image stabilization (OIS) associated with the telephoto sensor and the non-telephoto sensor during the simultaneously capturing of the at least one telephoto image and the at least one non-telephoto image; determine that a first scale of the telephoto sensor with respect to the non-telephoto sensor is a downsizing scale, the first scale being a ratio of the first FOV of the telephoto sensor to the second FOV of the non-telephoto sensor, and the downsizing scale corresponding to the first scale having a value that is less than 1; and downsize the motion function of the at least one telephoto image by the first scale, based on a determination that the first scale is the downsizing scale.

The motion characteristic may be an image-motion-blur originating from at least one of a common shake of the electronic device, a common local motion in the scene and a common global motion in the scene, and wherein the motion function may be an image-motion-trajectory.

The image rectification controller may be further configured to: determine at least one individual object of a plurality of objects independently moving with respect to the scene in the first FOV of the telephoto sensor; determine a local motion trajectory for each object of the plurality of objects in the at least one telephoto image; downsize the local motion trajectory of each object by the first scale, wherein the first scale is a telephoto factor; and deblur another at least one individual object in the at least one non-telephoto image corresponding to the at least one individual object of the plurality of objects in the at least one telephoto image.

The first image sensor may be a non-telephoto sensor, the second image sensor may be a telephoto sensor, the first FOV of the non-telephoto sensor may be greater than the second FOV of the telephoto sensor, the at least one first image may include at least one non-telephoto image, the at least one second image may include at least one telephoto image, and the image rectification controller may be further configured to: determine that the motion characteristic in the at least one telephoto image is greater than or equal to a motion threshold based on a size of the motion characteristic in the at least one non-telephoto image; prevent on-device optical image stabilization (OIS) associated with the telephoto sensor and the non-telephoto sensor during the simultaneously capturing of the at least one telephoto image and the at least one non-telephoto image; estimate the motion function in a certain FOV of the at least one non-telephoto image; determine that a first scale of the non-telephoto sensor with respect to the telephoto sensor is an upsizing scale, the first scale being a ratio of the first FOV of the non-telephoto sensor to the second FOV of the telephoto sensor, and the upsizing scale corresponding to the first scale having a value that is greater than 1; and upsize the motion function of the at least one non-telephoto image by the first scale, based on a determination that the first scale is the upsizing scale.

The motion characteristic may be an image-motion-blur which originates from a common shake of the electronic device, and wherein the motion function may be an image-motion-trajectory that arises from a real common motion trajectory of the electronic device due to a shake.

The image rectification controller may be further configured to: determine a real angular motion function of the electronic device based on an inertial mechanism in a first optical image stabilization (OIS) device associated with the first image sensor; determine, based on the real angular motion function, a real motion function for the second image sensor, wherein the second image sensor does not include a second OIS device; and apply the determined real motion function to the at least one second image to obtain the at least one rectified second image.

The motion characteristic may be a motion between two successive video frames, the motion function may be a dense-optical-flow, and the image rectification controller may be further configured to stabilize a portion of the second FOV of the at least one non-telephoto image which is common to the first FOV of the at least one telephoto image by applying a downsized dense-optical-flow to the at least one non-telephoto image.

The motion characteristic may be an object boundary, the motion function may be an object segmentation, and the image rectification controller may be further configured to apply a downsized object segmentation from the at least one telephoto image to the at least one non-telephoto image to enhance pixel-level segmentation of a corresponding small object in the at least one non-telephoto image.

The image rectification controller may be further configured to: pan the first image sensor and the second image sensor together across the scene; determine a plurality of objects that enter and exit the first FOV of the telephoto sensor; individually detect and segment each object of the plurality of objects that enters the first FOV of the telephoto sensor prior to a particular object exiting the first FOV of the telephoto sensor in the at least one telephoto image; downsize segmentations of the individually segmented plurality of objects in the at least one telephoto image by the first scale of the telephoto sensor with respect to the non-telephoto sensor; and apply each of the downsized segmentations to corresponding objects in the at least one non-telephoto image that correspond to the plurality of objects in the at least one telephoto image.

The motion characteristic may be curving and branching of an object in the at least one telephoto image, the motion function may be a second or higher derivative, and the image rectification controller may be further configured to apply a downsized second or higher derivative to the at least one non-telephoto image to calculate a segmentation of a corresponding object in the at least one non-telephoto image that corresponds to the object in the at least one telephoto image.

The motion characteristic may be an obstruction in the at least one telephoto image, the motion function may be a segmentation of the obstruction, and the image rectification controller may be further configured to apply a downsized segmentation to the at least one non-telephoto image to identify and remove a corresponding obstruction in the at least one non-telephoto image that corresponds to the obstruction in the at least one telephoto image.

The plurality of image sensors are further configured to: simultaneously switch on the first image sensor and the second image sensor of the electronic device for a specific duration of time; and simultaneously capture, during the specific duration of time, the at least one first image of the scene using the first image sensor and the at least one second image of the scene using the second image sensor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
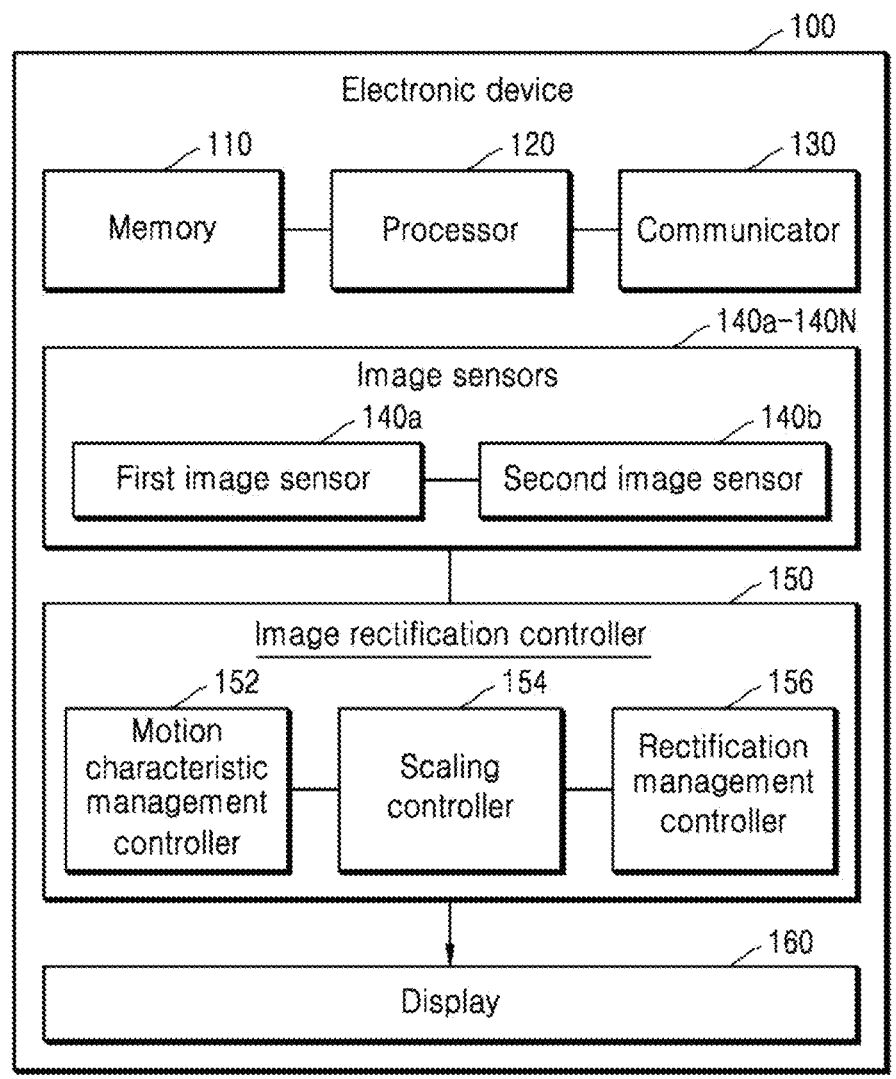
FIG. 1 illustrates a block diagram of an electronic device for rectifying an image by removing motion characteristic in an image, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, one or more embodiments of the disclosure provide a method for rectifying an image using an electronic device. The method may include simultaneously capturing, by the electronic device, at least one first image of a scene using a first image sensor of a plurality of image sensors and at least one second image of the scene using a second image sensor of the plurality of image sensors. A first field of view (FOV) of the first image sensor is different from a second FOV of the second image sensor. The method further includes detecting, by the electronic device, a motion characteristic in the at least one first image. The method further includes determining, by the electronic device, a motion function based on one of the at least one first image and a capture process of the at least one first image that caused the detected motion characteristic in the at least one first image. The method further includes scaling, by the electronic device, the motion function from the at least one first image by a scale of the first image sensor with respect to the second image sensor. The method further includes applying, by the electronic device, the scaled motion function onto the second FOV of the at least one second image to obtain at least one rectified second image that is unaffected by the detected motion characteristic.

Accordingly, one or more embodiments of the disclosure provide an electronic device for rectifying an image. The electronic device may include a memory, a processor, a communicator, a plurality of image sensors, and an image rectification controller. The processor is coupled to the memory. The communicator is coupled to the memory and the processor. The plurality of image sensors are coupled to the memory, the processor, and the communicator. The plurality of image sensors are configured to simultaneously capture at least one first image of a scene using a first image sensor of the plurality of image sensors and at least one second image of the scene using a second image sensor of the plurality of image sensors. A first field of view (FOV) of the first image sensor is different from a second FOV of the second image sensor. The image rectification controller is coupled to the memory, the processor, and the communicator. The image rectification controller is configured to determine a motion characteristic in the at least one first image. The image rectification controller is further configured to determine a motion function based on one of the at least one first image and a capture process of the at least one first image that caused the detected motion characteristic in the at least one first image. The image rectification controller is further configured to scale the motion function from the at least one first image by a scale of the first image sensor with respect to the second image sensor. The image rectification controller is further configured to apply the scaled motion function onto the second FOV of the at least one second image to obtain at least one rectified second image that is unaffected by the detected motion characteristic.

In general, telephoto and zoom imaging suffers more shake when compared to normal imaging, even though both cameras may be in same body (e.g., same shake) due to a reduced FOV in a telephoto camera which greatly expands a distance in pixels that a shake moves through. Optical Image Stabilization (OIS) is generally used and is driven by gyros that sense shake and provide appropriate pan and tilt correction to a lens in order to attempt to eliminate image blur at the source.

In another example, methods and systems in the related art use a low resolution secondary attached video-camera for estimating an actual motion trajectory of a main camera image for a deblurring algorithm. Typically, the secondary camera has the lower resolution than the main camera, however, the FOV of both cameras may be the same. Therefore, the blur kernel computed from the secondary camera has no motion amplification.

In yet another example, a method in the related art may capture an additional noisy, but sharp, very short duration image at the start of capture to form a noisy/blurred image pair with which the blur kernel may be computed and used to deblur the main image.

In another method in the related art, a hybrid camera system may be used to compute a spatially variant motion blur with optical flow. However, since the FOV of the hybrid camera system is the same, there is no impact on motion amplification.

Yet another method in the related art may perform non-blind deblurring by computing a blur kernel (e.g., a shake-induced image trajectory shown in a K×K rectangle) and de-convolving a captured image with the blur kernel. However, such a process may be resource intensive and not very efficient when compared to other related art methods such as the ones previously described.

In addition, methods using blind deblurring, which do not use a blur kernel, typically produce very poor results.

Unlike the related art methods and systems, a method according to an embodiment of the disclosure includes computing a large blur kernel trajectory (e.g., a 60×60 rectangle) from an additional telephoto camera (e.g., with a 3× amplification factor), and then downsizing the kernel by a correction factor (e.g., a factor of 3 in each direction) to give an accurate and sharp blur kernel trajectory (e.g., a 20×20 rectangle) for the main (e.g., wide-angle) camera, which may be used to deblur the normal image.

In some embodiments, the FOV of the main camera lens may be bigger than the FOV of the telephoto camera lens. However, the physical Angle (T) subtended by the blur trajectory of the telephoto lens may be substantially the same as the Angle (M) subtended by the blur trajectory of main lens. Therefore, while the blur shape may be substantially the same for both cameras, a ratio of the telephoto camera lens (e.g., Angle (T)/FOV (T)) may be larger than a ratio of the main camera lens (e.g., Angle (M)/FOV (M)). As such, assuming a similar pixel count in both lenses (e.g., the telephoto camera lens and the main camera lens), the blur trajectory in the telephoto image may be bigger than the blur trajectory in the main image.

Consequently, the proposed method includes running both cameras (e.g., the telephoto camera and the main camera) simultaneously to compute a proportionately large blur trajectory in the telephoto image. Then the telephoto image blur may be scaled down by the telephoto factor (e.g., 3×) to indirectly, but accurately, estimate a small blur in the main camera image which may not possible by direct estimation. Once the blur trajectory is obtained, accurate image deblurring may performed for the main (e.g., a wide-angle) camera. In an example, consider that the telephoto blur which is 60 pixels wide is a few pixels inaccurate then the error will reach zero when the trajectory is downsized by a factor of 3×.

Alternatively or additionally, the proposed method may use the main camera motion to obtain a global scene motion and/or a varying combination of the global scene motion and the blur trajectory. If the global scene motion is zero, but two objects are moving towards each other at the center of a scene, then the two objects can be segmented in real time using artificial intelligence, for example. Alternatively or additionally, very small blur trajectories of the objects may need to be calculated using the telephoto to deblur only the two objects.

Unlike the related art methods and systems, the proposed method can also be used when the shake is very large such that the telephoto image moves almost as much as and/or more than the image width, which may make it algorithmically impossible to compute the blur trajectory of the telephoto image. In such an embodiment, the small blur in the main camera can be scaled up to estimate the telephoto blur. Alternatively or additionally, since an image with even a small blur cannot be super-resolved properly, deblurring is an essential initial operation for accurate shake reduction (SR), whether using related art computer vision or deep neural network (DNN) methods.

In the related art, deblurring of the image may be performed using algebraic techniques which may be time and resource consuming and complex. Alternatively or additionally, if the shake is larger than a predefined threshold, then obtaining a corresponding blur kernel may be additionally complex when compared to obtaining a blur kernel with a smaller shake. Alternatively or additionally, when the shake is complex (e.g., complex pattern) then de-blurring may not be accurately performed even if the magnitude of the shake is small (e.g., significantly less than the predefined threshold).

A wide-angle sensor camera may not be used alone for de-blurring because the image movement due to shake may be too small to be algorithmically estimated precisely. In contrast, an image movement of a telephoto camera due to the same shake may be much more amplified. Thus, the accuracy and sharpness of the estimated wide-angle sensor blur may be improved by the use of a downsized telephoto kernel applied for de-blurring of the wide-angle sensor blur.

Referring now to the drawings, and, more particularly, to FIGS. 1 through 8, where similar reference characters denote corresponding features consistently throughout the figures, there are shown example embodiments.

FIG. 1 illustrates a block diagram of an electronic device (100) for rectifying an image by removing motion characteristic in the image, according to an embodiment. The electronic device (100) can be, but not limited to, a laptop, a palmtop, a desktop, a mobile phone, a smart phone, Personal Digital Assistant (PDA), a tablet, a wearable device, an Internet of Things (IoT) device, a virtual reality device, a foldable device, a flexible device and an immersive system.

In an embodiment, the electronic device (100) includes a memory (110), a processor (120), a communicator (130), multiple image sensors (140a-140N), an image rectification controller (150), and a display (160).

The memory (110) is configured to store a first image, a second image, and corresponding rectified second image, along with a scale of a first image sensor (140a) with respect to the second image sensor (140b). Further, the memory (110) also stores instructions to be executed by the processor (120). The memory (110) may include non-volatile storage elements. Examples of such non-volatile storage elements may include, but are not limited to, magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can change over time (e.g., in Random Access Memory (RAM) or cache).

The processor (120) communicates with the memory (110), the communicator (130), the multiple image sensors (140a-140N), the image rectification controller (150), and the display (160). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an AI dedicated processor such as a neural processing unit (NPU).

The communicator (130) includes an electronic circuit specific to a standard that enables wired or wireless communication. The communicator (130) is configured to communicate internally between internal hardware components of the electronic device (100) and with external devices via one or more networks.

The multiple image sensors (140a-140N) include a first image sensor (140a) and a second image sensor (140b). The first image sensor (140a) may be a telephoto image sensor (140a) and the second image sensor (140b) may be a non-telephoto image sensor (140b). The first image sensor (140a) and a second image sensor (140b) are simultaneously switched on for a specific duration of time and simultaneously capture a first image of a scene and a second image of the scene. The first image sensor (140a) and the second image sensor (140b) complete the exposure at the same time. The first image and the second image are the last images retrieved from the telephoto buffer and the non-telephoto image buffer, respectively, after the shutter is pressed, when the first image sensor (140a) is telephoto sensor and the second image sensor (140b). During operation, a lens focuses light onto the first image sensor (140a) and/or second image sensor (140b). Pixels in the first image sensor (140a) and/or second image sensor (140b) include photosensitive elements that convert the light into digital data and capture the image frame of the scene. A typical image sensor may, for example, have millions of pixels (e.g., megapixels (MP)) and is configured to capture a series of image frames of the scene based on a single click input from a user. Each of the multiple image sensors (140a-140N) comprises different focal lengths. The first image and the second image may be, for example, still images capturing the scene, video comprising multiple images, or a combination thereof.

In an embodiment, the image rectification controller (150) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The image rectification controller (150) comprises a motion characteristic management controller (152), a scaling controller (154), and a rectification management controller (156).

In an embodiment, the motion characteristic management controller (152) is configured to determine a motion characteristic in the first image and determine a motion function from either the first image or the first image capture process that caused the detected motion characteristic in the first image. The motion function is determined using existing sensors of the electronic device (100) which may include, but not limited be to, the sensors used in optical image stabilization (OIS). For example, consider a physical motion occurring in a 4 pixel by 4 pixel rectangle, or 16 pixels. In such an example, if the camera has a resolution of 48 MP, then there is a total blur of 16 pixels. That is, the 48 MP camera would act like a 3 MP camera.

The motion characteristic management controller (152) is configured to determine whether the motion characteristic in the non-telephoto image is less than a motion threshold based on a size of motion characteristic in the telephoto image. That is, when the expected motion characteristic, such as the shake is very small but significant or if the shake is too complex for the OIS to handle such as for example a "S" or "W" pattern shake, then the proposed method may be applied. Generally, the OIS includes a physical sensor in the lenses which senses the shake and guides the lenses in the opposite direction to compensate for the shake. The acquisition of any image happens over a period of time, and not in a single instant of time, (e.g., 100 milliseconds (ms)) but the shake may have a 200 ms duration. Therefore, the image captured may be blurred due to the shake. Photons from the scene accumulate over the period of time, and, when the lenses moves, the photons arriving from a same location (e.g., a black patch of a tiger) may arrive at a different spot on the sensor. The OIS may be configured to compensate for the shake, such that the same black patch arrives at the same spot regardless of the movement caused due to the shake. In some scenarios, the OIS is done to a first degree. Typically, shakes are jerks and are discrete (e.g., the shakes jump, reset, jump, reset, etc.). However, the OIS compensates only physical motion of the lens and not the movement of the target. As such, if the momentum of the shake is very low, then due to the inertia of the OIS mechanism, the OIS may not be capable of moving instantaneously to compensate for the complex shake.

The motion characteristic is captured using a motion kernel (e.g., a blur kernel) where the shake-induced image trajectory is shown in a K×K rectangle. The blur kernel calculation includes capturing a main image with normal settings from both the first image sensor (140a) and the second image sensor (140b). Alternatively or additionally, the blur kernel calculation may include capturing pilot images of extra short duration exposure (which may be grainy but sharp) from the first image sensor (140a) and the second image sensor (140b) just at a start of the main image capture (e.g., a last image in the camera buffer). Alternatively or additionally, the pilot images and the normal images are used together to compute the blur kernel.

In some embodiments, the first image sensor (140a) is a telephoto sensor, the second image sensor (140b) is a non-telephoto sensor, a FOV of the telephoto sensor is smaller than the FOV of the non-telephoto sensor and the scale of the telephoto sensor with respect to the non-telephoto sensor is a downsizing scale with a ratio less than 1. The image-motion-trajectory is the perceived motion trajectory of the scene or of the scene objects in the image. The image-motion-trajectory may arise from a common motion trajectory of the electronic device (100) due to either a shake of the electronic device (100) while capturing the image or due to a motion of the scene or a target object in the scene, which therefore causes geometrically similar image-motion-blur in all the image forming sensors in the electronic device (100). The difference in size of the perceived motion trajectory with respect to the image size for any image sensor in the electronic device (100) is decided by the FOV of the particular sensor. The image motion trajectory which is estimated from the first image formed by the first telephoto sensor in the electronic device (100) may also be able to provide a precise but small image motion trajectory for any second non-telephoto sensor in the electronic device (100) by scaling the image motion trajectory down by the smaller-than-1 downsizing ratio of their respective fields of view, thus alleviating the difficulty of directly estimating very small motion trajectories for the non-telephoto sensor. For example, consider that a telephoto blur kernel has a size of 30×40 pixels, then the normal blur kernel may have the same shape but have a size of 6×8 pixels. That is, if a trajectory line in telephoto blur kernel has a thickness of 5 pixels (e.g., inaccurate), then the trajectory line in the downsized kernel have a thickness of 1 pixel-. Thus, the downsized blur kernel may have a greater accuracy.

In another embodiment, the motion characteristic management controller (152) is configured to determine that the motion characteristic in the telephoto image is greater than a motion threshold based on a size of motion characteristic in the non-telephoto image. In such an embodiment, the first image sensor (140a) is a non-telephoto sensor, the second image sensor (140b) is a telephoto sensor, a FOV of the non-telephoto sensor is greater than the FOV of the telephoto sensor and the scale of the non-telephoto sensor with respect to the telephoto sensor is an upsizing scale with a ratio greater than 1. The image motion trajectory which is estimated from the first image formed by the non-telephoto sensor in the electronic device (100) may also be able to provide image motion trajectory for the telephoto sensor by scaling up the image motion trajectory by the larger-than-1 upsizing ratio of their respective fields of view, thus alleviating the difficulty of directly estimating and correcting very large motion trajectories for the telephoto sensor.

In another embodiment, the motion characteristic is an image-motion-blur originating from one of a common shake of the electronic device (100), a common local motion in the scene and a common global motion in the scene and the motion function is an image-motion-trajectory.

In another embodiment, the motion characteristic is a detected motion between two successive video frames and the motion function is a dense-optical-flow. The downsized dense-optical-flow is applied to achieve a stabilization of the FOV of the non-telephoto video which is common to the FOV of the telephoto video, and to any remaining portion of the FOV of the non-telephoto video if the motion function is estimated to be the same there.

In another embodiment, the motion characteristic is an object boundary and the motion function is an object segmentation, wherein a downsized segmentation from the telephoto image is applied to the non-telephoto image to enhance pixel-level segmentation of a corresponding difficult-to-segment small object in the non-telephoto image.

In another embodiment, the motion characteristic is an image-motion-blur which originates from the common shakes of the device and the motion function is an image-motion-trajectory that arises from a real common motion trajectory of the electronic device (100) due to a shake.

In an embodiment, the scaling controller (154) is configured to determine a scale of the first image sensor (140a) with respect to the second image sensor (140b) and to scale the motion function from the at least one first image by the scale of the first image sensor (140a) with respect to the second image sensor (140b). The scale is a ratio of a FOV of the first image sensor (140a) to a FOV of the second image sensor (140b). The scaling controller (154) is configured to disable any on-device optical image stabilization (OIS) associated with the telephoto sensor and the non-telephoto sensor before capturing the telephoto image and the non-telephoto image, and downsize the motion function of the at least one telephoto image by the less-than-1 downsizing ratio.

In an embodiment, the scaling controller (154) is configured to determine individual objects of multiple objects independently moving with respect to the scene in a FOV of the telephoto sensor and determine a local motion trajectory for each individual object of the plurality of objects independently in the telephoto image. Alternatively or additionally, the scaling controller (154) is configured to downsize the local motion trajectory of each individual object by the downsizing ratio and deblur the corresponding at least one individual object in the non-telephoto image. In some embodiments, the downsizing ratio may be referred to as a telephoto factor.

In an embodiment, the scaling controller (154) is configured to disable any on-device optical image stabilization (OIS) associated with the telephoto sensor and the non-telephoto sensor before capturing the telephoto image and the non-telephoto image and to estimate the motion function in a certain FOV of the at least one non-telephoto image. Alternatively or additionally, the scaling controller (154) is configured to upsize the motion function by the upsizing ratio which is greater than 1.

In an embodiment, the rectification management controller (156) is configured to apply the scaled motion function onto a FOV of the at least one second image to obtain at least one rectified second image free of the detected motion characteristic. That is, the at least one rectified second image is unaffected by the detected motion characteristic. The rectification management controller (156) is configured to determine the motion function from inertial sensor in the optical image stabilization (OIS) associated with the first image sensor (140a), resize the motion function of the first image sensor (140a) by the determined ratio to obtain a motion function for the at least one second image sensor (140b), which does not include the OIS mechanism, to and apply the resized motion function to the second sensor image to obtain the at least one rectified second sensor image.

The rectification management controller (156) is configured to apply the downsized motion function onto the FOV of the non-telephoto image to obtain the rectified non-telephoto image free of the detected motion characteristic. That is, the rectified non-telephoto image is unaffected by the detected motion characteristic. Similarly, the rectification management controller (156) is configured to apply the upsized motion function onto the FOV of the telephoto image to obtain the rectified telephoto image free of the detected motion characteristic.

In another embodiment, the rectification management controller (156) is configured to pan the first image sensor (140a) and the second image sensor (140b) together across the scene and determine a plurality of objects that enter and exit the FOV of the telephoto sensor. The first image sensor (140a) is a telephoto sensor, the second image sensor (140b) is a non-telephoto sensor, the motion characteristic is an object boundary and the motion function is object segmentation. Alternatively or additionally, the rectification management controller (156) is configured to individually detect and segment the plurality of objects that enters the FOV of the telephoto sensor before the plurality of objects exit the FOV of the telephoto sensor in the telephoto image. Alternatively or additionally, the rectification management controller (156) is configured to downsize the individually segmented plurality of objects seen in the telephoto image by the scale of the telephoto factor of the telephoto sensor with respect to the non-telephoto sensor and apply each of the downsized segmentations to the corresponding objects in the non-telephoto image, even when the plurality of objects exit the FOV of the telephoto sensor.

At least one of the plurality of modules/components of the image rectification controller (150) may be implemented through an AI model. A function associated with the AI model may be performed through the memory (110) and the processor (120). The one processor or the plurality of processors controls the processing of the input data in accordance with a predefined operating rule and/or the AI model stored in the non-volatile memory and the volatile memory. The predefined operating rule or artificial intelligence model is provided through training or learning.

In some embodiments, being provided through learning may refer to making a predefined operating rule or AI model of a desired characteristic by applying a learning process to a plurality of learning data. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (e.g., a robot) using a plurality of learning data to cause, allow, or control the target device to make a determination or prediction. Examples of learning processes include, but are not limited to, supervised learning, unsupervised learning, semi-supervised learning, or reinforcement learning.

The display (160) is configured to display the rectified image after the removal of the motion characteristic in the first image and the second image on a screen of the electronic device (100). The display (160) is capable of receiving inputs and is made of one of liquid crystal display (LCD), light emitting diode (LED), organic light-emitting diode (OLED), etc.

Although FIG. 1 shows various hardware components of the electronic device (100), it is to be understood that other embodiments are not limited thereon. In other embodiments, the electronic device (100) may include less or more number of components. Further, the labels or names of the components are used only for illustrative purpose and does not limit the scope of the disclosure. One or more components can be combined together to perform same or substantially similar function to rectify the image by removing the motion characteristic in the image.

Figure 2:
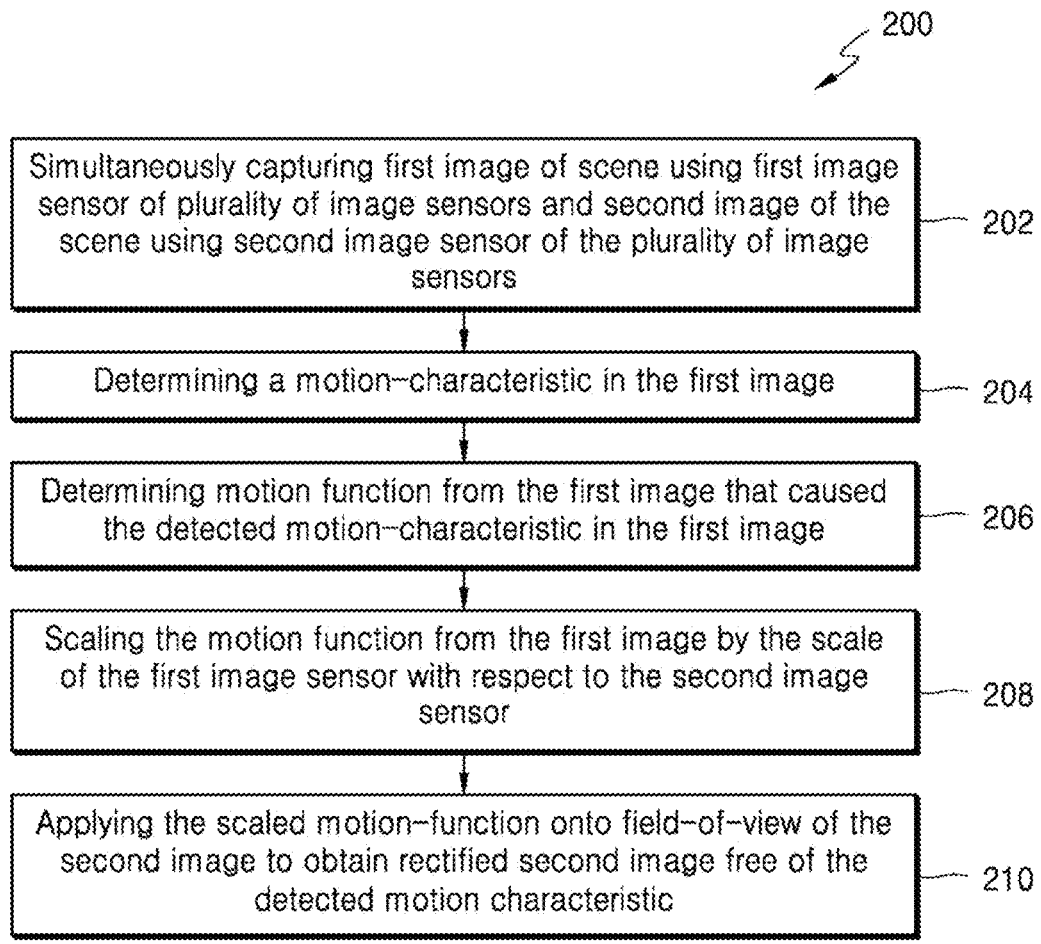
FIG. 2 is a flow diagram illustrating a method for rectifying the image by removing the motion characteristic in the image, according to an embodiment.

FIG. 2 is a flow diagram (200) illustrating a method for rectifying the image by removing the motion characteristic in the image, according to an embodiment.

Referring to the FIG. 2, at operation 202, the electronic device (100) simultaneously captures the first image of the scene and the second image of the scene. For example, in the electronic device (100) as illustrated in the FIG. 1, the first image sensor (140a) is configured to capture the first image, and the second image sensor (140b) is configured to capture the second image simultaneously.

At operation 204, the electronic device (100) determines the motion characteristic in the first image. For example, in the electronic device (100) as illustrated in the FIG. 1, the image rectification controller (150) is configured to determine the motion characteristic in the first image.

At operation 206, the electronic device (100) determines the motion function from the first image that caused the detected motion characteristic in the first image. For example, in the electronic device (100) as illustrated in the FIG. 1, the image rectification controller (150) is configured to determine the motion function from the first image that caused the detected motion characteristic in the first image.

At operation 208, the electronic device (100) scales the motion function from the first image by the scale of the first image sensor (140a) with respect to the second image sensor (140b). For example, in the electronic device (100) as illustrated in the FIG. 1, the image rectification controller (150) is configured to scale the motion function from the first image by the scale of the first image sensor (140a) with respect to the second image sensor (140b).

At operation 210, the electronic device (100) applies the scaled motion function onto a FOV of the second image to obtain the rectified second image free of the detected motion characteristic. That is, the rectified second image is unaffected by the detected motion characteristic. For example, in the electronic device (100) as illustrated in the FIG. 1, the image rectification controller (150) is configured to apply the scaled motion function onto a FOV of the second image to obtain the rectified second image free of the detected motion characteristic.

In some embodiments, the present disclosure can be used, without limitation, with single lens reflex (SLR) cameras by attaching a small 10-30X spotting telephoto camera. Alternatively or additionally, the present disclosure may be used, without limitation, in limited-use configurations such as optical telescopes (e.g., without OIS) for image-based capture, the additional camera need not face a direction where the main camera faces, since the camera matrix can be rotated. The small kernel and grainy image can be computed and persisted as image meta-data, so that off-line post-processing (e.g, deblur and SR) can be performed at a later stage.

The various operations, actions, acts, blocks, steps, or the like in the flow diagram (200) may be performed in the order presented, in a different order or simultaneously. Further, in some embodiments, some of the operations, actions, acts, blocks, steps, or the like may be omitted, added, modified, skipped, or the like without departing from the scope of the disclosure.

Figure 3A:
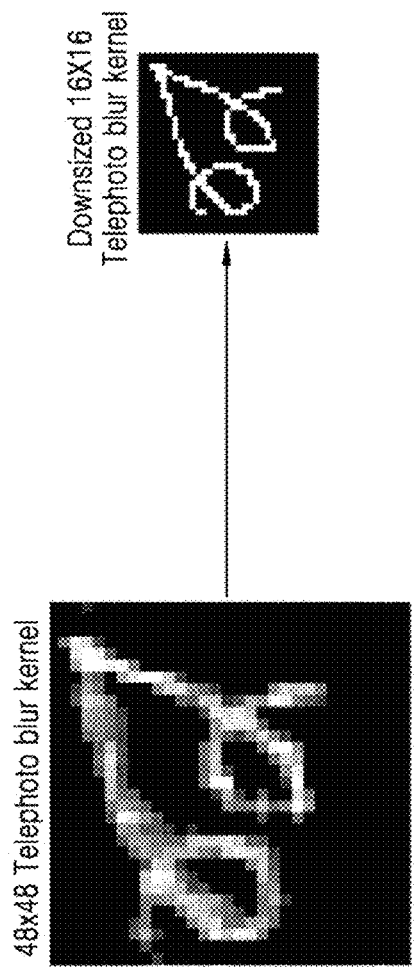
FIG. 3A illustrates downsizing of a motion function from a telephoto image that caused a detected motion characteristic in the telephoto image, according to an embodiment.

FIG. 3A illustrates downsizing of the motion function from the telephoto image that caused the detected motion characteristic in the telephoto image, according to an embodiment.

Figure 3B:
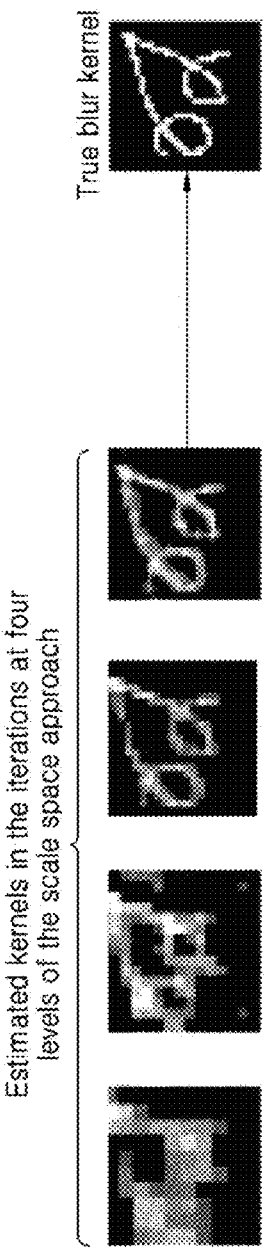
FIG. 3B illustrates estimated kernels in iterations at multiple levels of scale space approach with true blur kernel, according to an embodiment.

FIG. 3B illustrates estimated kernels in iterations at multiple levels of scale space approach with the true blur kernel, according to an embodiment.

The ensuing operations detail one method (among many known methods) of computing the blur kernel from the captured blurry image and a pilot noisy but sharp image. Referring to the FIG. 3A, consider that a duration of the pilot noisy telephoto image N is $\Delta t_N$ and that of a blurry telephoto image B is $\Delta t_B$. The pilot noisy telephoto image N is pre-multiplied by a factor (ISOB $\Delta t_B$)/(ISON $\Delta t_N$) in the irradiance or received illumination space. The pre-multiplication is performed to account for the difference between the B and the N images. Further, the pilot noisy telephoto image N which is pre-multiplied is denoised with a denoising algorithm, for example, but not limited to, non-local means (NLM) to provide a good initial estimate N for the unknown blur-free image matrix A in the kernel estimation algorithm.

Consider the blur kernel of the telephoto image as K. The blur model is rewritten as (b=Ak) where b and k are the linearized vectors of B and K, and A is the matrix form of the original deblurred image I. The estimation of the kernel K is expressed as a linear least squares problem with Tikhonov regularization as follows:

$$\min_k \|b - Ak\|^2 + \lambda^2 \|k\|^2 \qquad [\text{Eq. 1}]$$

such that $k_i \geq 0$ and $\Sigma_i k_i = 1$ (these come from energy preservation and non-negative constraints).

Further, a known Landweber's method is used to solve (1) with hysteresis thresholding in scale space with a dynamic step size (instead of a constant as used in related art methods). In the example, $1/\sqrt{2}$ is used as the down-sampling factor with lower and upper hysteresis thresholds as 0.23 and 0.28. The estimated kernels in the iterations at four levels of the scale space approach and the resulting true blur kernel, are shown in the FIG. 3B. A smaller section of the telephoto image can be used for determining the motion kernel to reduce a computation time.

The iteration in scale space converges rapidly towards the true blur kernel. The estimated telephoto blur kernel K is downsized by the telephoto factor to give the main camera blur kernel K'. Alternatively or additionally, an estimate of deblurred telephoto image A may also available as a by-product of the calculations. For example, consider the estimated 48×48 telephoto blur K (as shown in FIG. 3A), when downsized by a telephoto factor of 3× (to a 16×16 blur K), the downsized blur provides the main camera blur kernel. The main camera blur kernel may be sharper because of the downsizing and closer to the true blur kernel.

In another embodiment, joint estimation of the motion kernel along with the OIS sensors of the electronic device (100) is performed. In the related art methods and systems, the OIS sensors move the lens of the telephoto image sensor (140a) and the non-telephoto image sensor (140b) to rectify the blur caused by the shake of the electronic device (100). However, in aspects of the present disclosure, the electronic device (100) does not use the OIS sensors to move the lens of the telephoto image sensor (140a) and the non-telephoto image sensor (140b) and are used to measure and/or track the lens motion during the blur causing event such as the shake. Alternatively or additionally, the electronic device (100) verifies and fuses the motion estimates from the telephoto image sensor (140a) and the non-telephoto image sensor (140b) and the computed telephoto blur kernel (e.g., joint estimate) before applying the kernel resizing solution described herein to the main camera image. As a result, the accuracy of motion estimates obtained in any relevant derivative spaces (e.g., 0, 1, 2, 3) may be increased.

Figure 4:
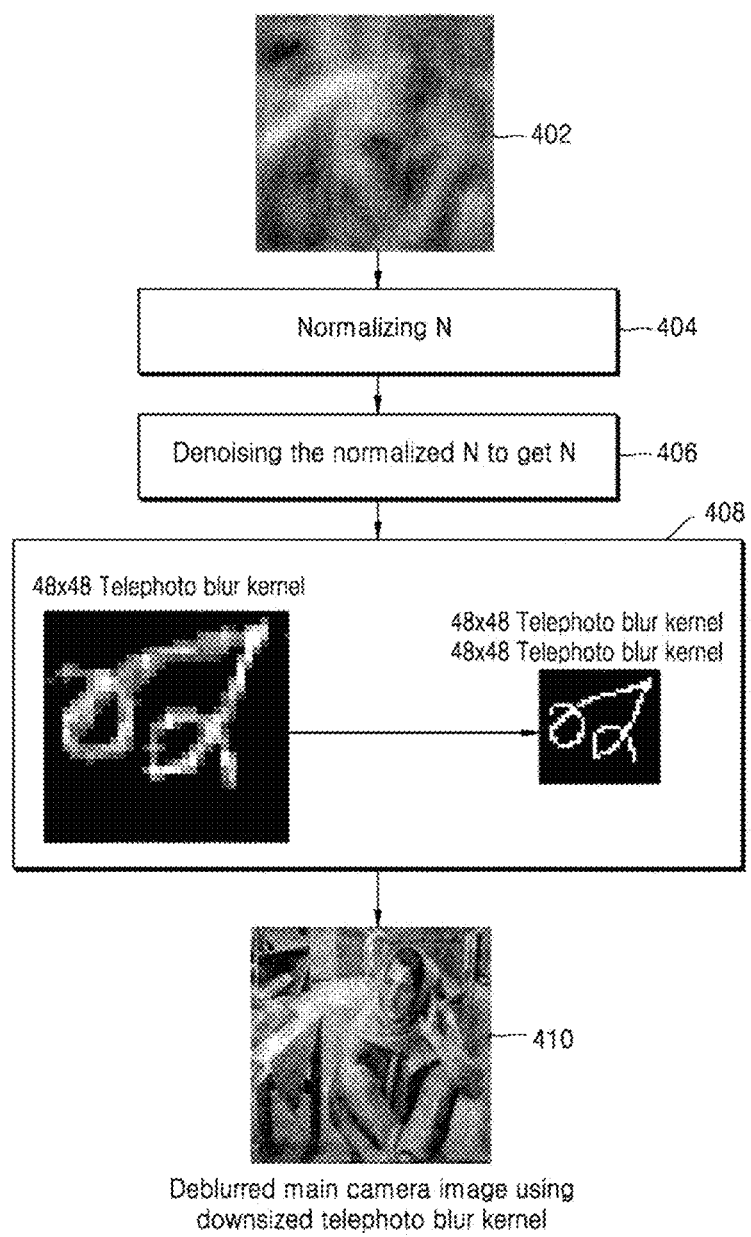
FIG. 4 illustrates an example of use of the blur kernel associated with first image sensor to deblur second image captured by second image sensor, according to an embodiment.

FIG. 4 illustrates an example of use of the blur kernel associated with the first image sensor (140a) to deblur the second image captured by the second image sensor (140b), according to an embodiment.

Referring to the FIG. 4, consider that the first image sensor (140a) is the telephoto sensor and the second sensor (140b) is the non-telephoto sensor. Further, consider that the blur kernel associated with the telephoto sensor is used to deblur the image of the non-telephoto sensor. Consider the noisy image N captured using the non-telephoto sensor is a related art Barbara test image (operation 402). The method to deblur the image using the telephoto blur kernel may include the following operations.

At operation 404, the electronic device (100) normalizes the noisy image N in the irradiance space to account for the difference between B and N.

At operation 406, the electronic device (100) denoises the normalized noisy image N with a denoising algorithm to provide a good initial estimate N' for the unknown blur-free telephoto image matrix A.

At operation 408, the electronic device (100) executes the kernel estimation algorithm (as described with respect to the FIG. 3A and the FIG. 3B) to get the telephoto kernel K (e.g., 48×48).

The estimated telephoto blur kernel K is downsized by the telephoto factor (e.g., 3×) to give the main camera blur kernel K' (e.g., 16×16).

At operation 410, the electronic device (100) deblurs the image captured by the non-telephoto sensor using the kernel K'.

The sharpness and the accuracy of the estimated main camera kernel K' may be mostly attributed to the telephoto sensor optically amplifying the blur, which facilitates computing and approximating the main camera blur kernel K', and to the downsizing/processing of the estimated telephoto blur kernel K converting an approximate big kernel to a sharp/accurate small kernel for the non-telephoto sensor.

Figure 5:
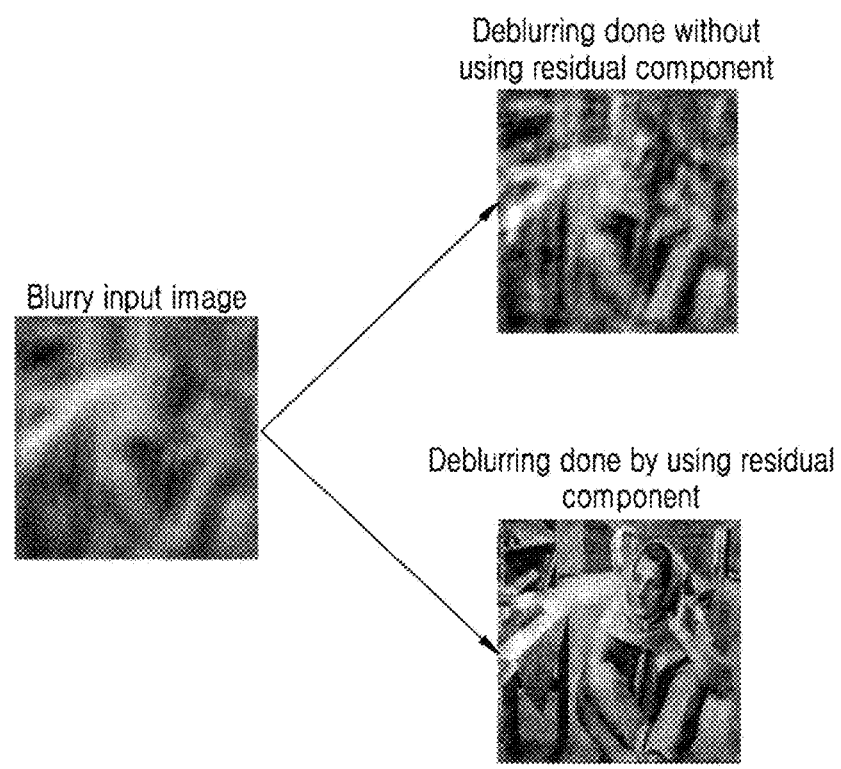
FIG. 5 illustrates an example of a comparison of use of de-convolution for deblurring of non-telephoto sensor using related art mechanisms and using the blur kernel of the telephoto sensor, according to an embodiment.

FIG. 5 illustrates an example of a comparison of the below-described use of residual components in the de-convolution for deblurring of the non-telephoto sensor image according to an embodiment.

Referring to FIG. 4, the electronic device (100) determines the telephoto ratio (e.g., 3×), downsizes the computed telephoto blur kernel, and morphologically processes the downsized blur kernel to provide the blur kernel K' to the non-telephoto sensor. The blur kernel K', the main blurry image B' and the main pilot image N' are used to compute a blur free image of the non-telephoto sensor.

The blur kernel is assumed to be spatially invariant, and the motion blur is modelled as follows:

$$B'(x) = (I \text{ CONV } K')(x) + \eta(x) \quad [\text{Eq. 2}]$$

where I is the blur-free main camera image to be estimated from B' and the main blur kernel K', x=(x,y), and where $\eta(x)$ is the independent and identically distributed (i.i.d.) noise at each pixel ($\eta(x)$ may be ignored because $\eta(x)$ is substantially smaller than the noise in the main pilot image N').

The method to deblur the image includes:

1. Denoising the main pilot image N' to yield pilot image ND.

2. Model I as:

$$I = N_D + \Delta \cdot I \quad [\text{Eq. 3}]$$

Instead of estimating the I directly, the electronic device (100) estimates the residual image $\Delta \cdot I$ because the residual image includes small quantities (in proportion to I) which directly results in proportionately reducing the overall deconvolution errors. Once the $\Delta \cdot I$ is estimated, the I can be recovered directly by expressing I as $N_D + \Delta \cdot I$.

3. Set $\Delta \cdot B = B - N_D \text{ conv } K'$ [Eq. 4]

with $\Delta \cdot B$ representing the "residual" blurred image.

4. Reformulating the de-convolution issues as $\{\Delta \cdot B = \Delta \cdot I \text{ conv } K'\}$, which is the modified version of [Eq. 4] for the de-convolution, the goal is to estimate $\Delta \cdot I$ iteratively.

The de-convolution can be performed using, for example, but not limited to, Richardson Lucy (RL), Algebraic Deconvolution, and basis Pursuit de-convolution. The basis pursuit de-convolution technique is used to obtain higher accuracy and faster results as the same is formulated in the Fourier domain. The significant improvement from the de-convolving with residual image method is shown in the FIG. 5.

Figure 6:
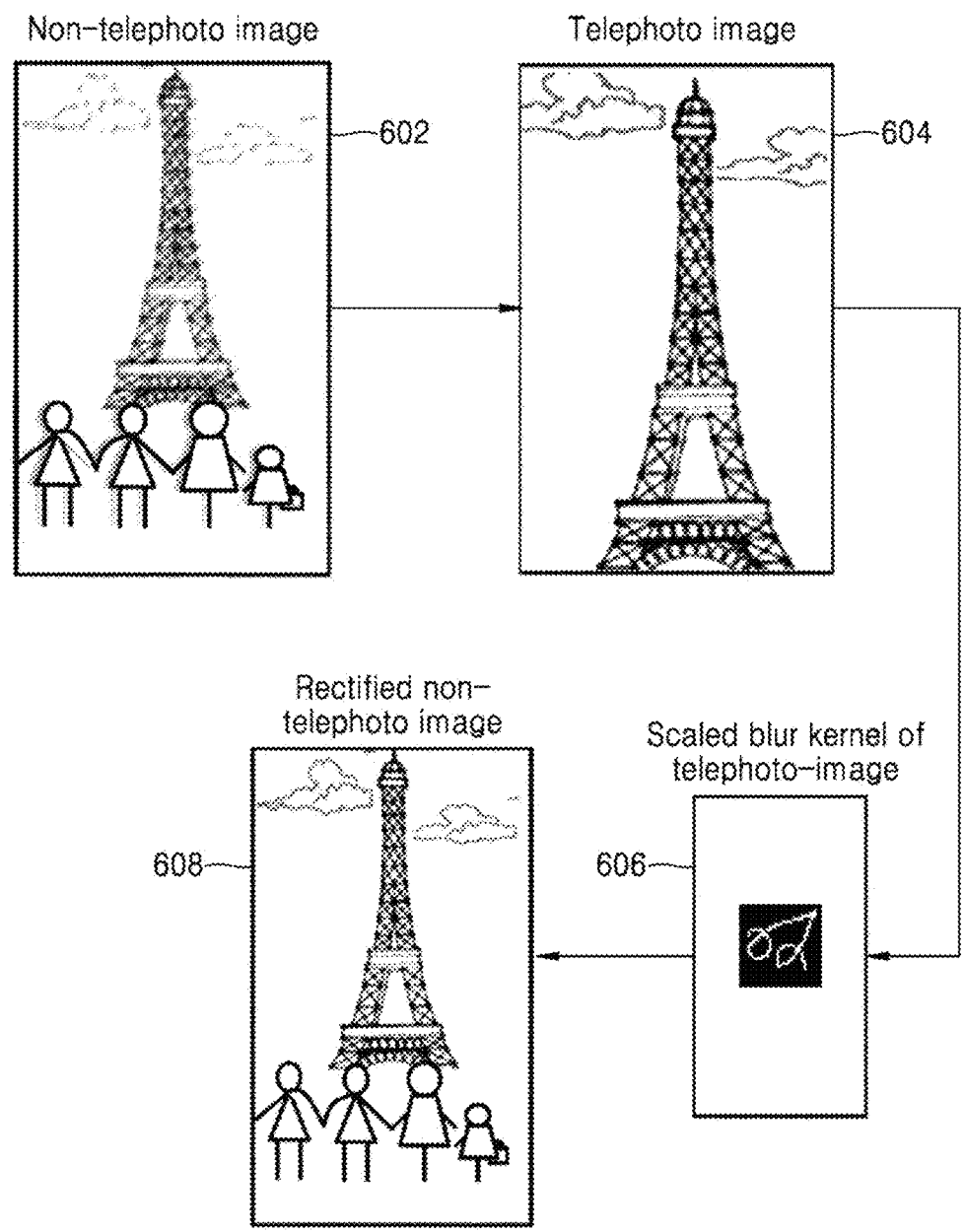
FIG. 6 illustrates an example of a scenario of rectifying the blurred non-telephoto image using the telephoto blur kernel of the telephoto image, according to an embodiment.

FIG. 6 illustrates an example of a scenario of rectifying the blurred non-telephoto image using the telephoto blur kernel of the telephoto image, according to an embodiment.

Referring to the FIG. 6, consider at operation 602 the blurred non-telephoto image of the scene is captured using the electronic device (100). The non-telephoto image can be for example a wide-angle image. The non-telephoto image generally captures a larger FOV than the telephoto image. However, the non-telephoto image is not as sharp as the telephoto image. The electronic device (100) simultaneously also captures the telephoto image of the same scene.

At operation 604, the electronic device (100) determines that the blur is caused by the shake of the electronic device (100) while capturing the image of the scene and that the shake is below a shake threshold that the electronic device (100) may be able to compensate for in the image. When taking a shot with the non-telephoto camera under very small shake, the much larger telephoto blur is first computed to verify there was the shake. Small sensor value changes may not be accurate, where the telephoto image trajectory due to the shake can be computed accurately from the blur.

Further, the electronic device (100) disables the on-device OIS associated with the camera unit. At operation 604, the electronic device (100) determines the blur kernel of the telephoto image and the scale of the telephoto sensor with respect to the non-telephoto image sensor. At operation 606, the electronic device (100) downsizes the blur kernel of the telephoto image using the scale of the telephoto sensor. At operation 608, the electronic device (100) applies the downsized blur kernel of the telephoto image to the non-telephoto image for deblurring the non-telephoto image.

Therefore, unlike to the related art methods and systems, in the proposed method the existing cameras of different fields of view in the electronic device (100) are used to rectify the image.

In another embodiment, the operations 602 to 608 are also used for correcting the telephoto images under very large camera shake, except that the roles of the two cameras are interchanged, and the smaller blur kernel estimated from the wide-angle or the ultra-wide-angle sensor is upsized by the telephoto factor to produce a blur estimate for the telephoto sensor. Further, the upsized telephoto factor is used to deblur the telephoto image. In an example, consider that the users use the telephoto sensor to shoot from a moving train or bus. The OIS of the electronic device (100) may not be able to compensate for the shake fully because the blur is too much to correct in these cases. Therefore, the electronic device (100) locks the two OISs and captures the telephoto image, and then uses the amplified smaller wide-angle blur to deblur the telephoto image.

In yet another embodiment, consider the scenario of a combination of the camera shake and motion of the scene or the target object. The electronic device (100) obtains a joint estimate of the blur in the image by fusing (e.g., using AI) the sensor output from the OIS with the computed blur kernel.

In yet another embodiment, deblurring an intra-shot may use the same procedure for removing the motion blur due to the target or the scene motion. The electronic device (100) may detects this scenario and execute the operations 602 to 608 to capture and deblur the image. Further, example sub cases may include, but are not limited to, global motion where the image of the moving scene is captured using the wide-angle camera, capturing from the moving car, train or plane, capturing moon in long exposure at night from a tripod. Further, sub-examples may also include, but are not limited to, local motion captured using the telephoto to track the moving object like the car in the center of a relatively static scene, while taking a picture with the primary wide-angle camera. Here, the telephoto blur kernel may be calculated only for the selected moving object (e.g., segmented inside the bounding box by real-time AI), and the kernel is downsized and then transferred to the same moving object inside the corresponding transferred bounding box in the main camera image which is then deblurred. The remaining image outside the segmented object is not deblurred assuming it is not moving.

In yet another embodiment, an inter-shot for obtaining improved image stabilization of the wide-angle image from the telephoto computations is performed. The electronic device (100) determines the optic flow and other parameters from the telephoto image and re-applies for obtaining the wide-angle stabilization. While the global motion stabilization of the wide-angle requires only simple global flow resizing from the telephoto sensor, the local motion is handled as per requirement. For example, in a night shot scenario, since flow computation will not be accurate in low light, the sensor movement is used as an additional measure of the motion by the electronic device (100).

In yet another embodiment, a second derivative unit of a Hessian Domain computation is performed. The detection of arbitrary continuous and branching lines in cluttered background (e.g., wires, etc.) is performed. The Hessian and Eigen vector computations essential to detecting lines in noisy image backgrounds are performed and scaled using the techniques described herein on the telephoto image. As a result, much clearer and sharper images in the wide-angle FoV situations may be obtained.

Figure 7:
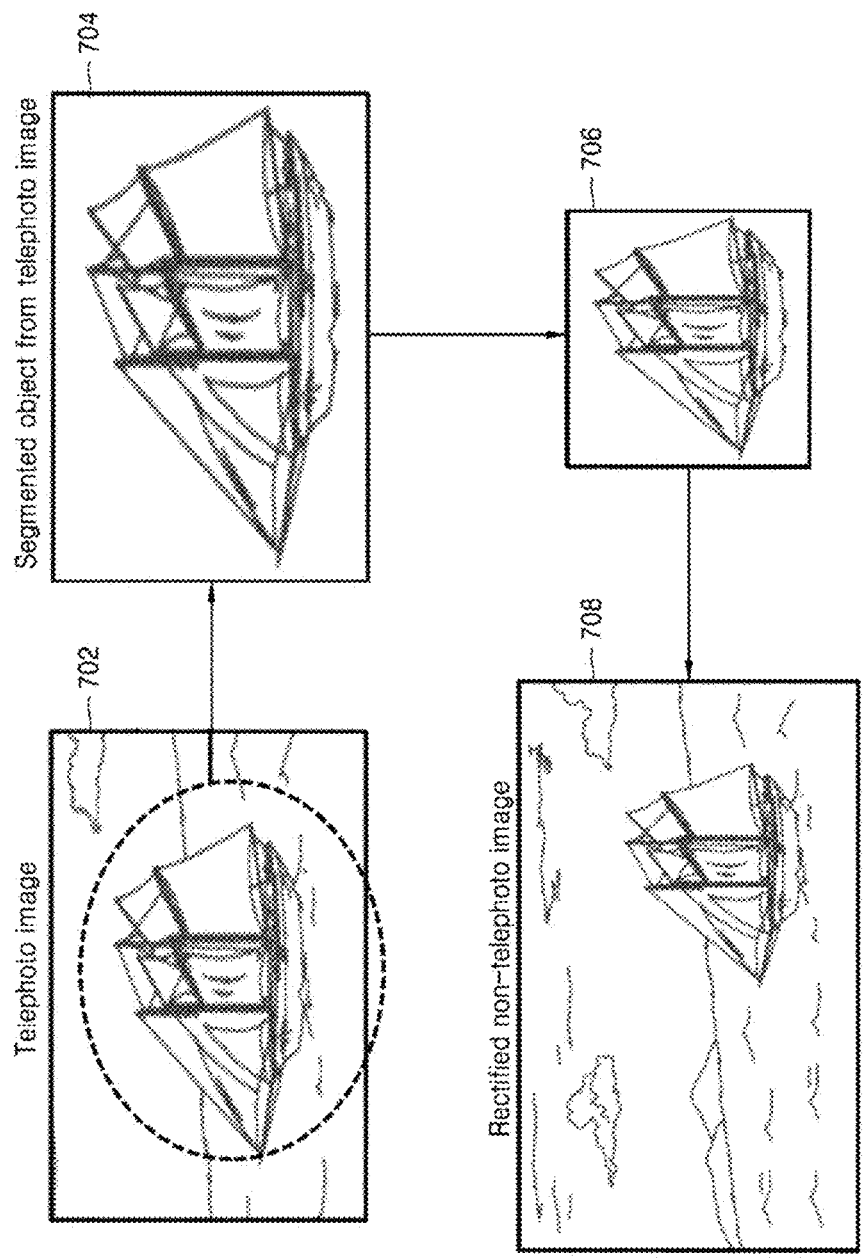
FIG. 7 illustrates an example of a scenario of object segmentation using the telephoto image captured by the electronic device, according to an embodiment.

FIG. 7 illustrates an example of a scenario of object segmentation using the telephoto image captured by the electronic device (100), according to an embodiment.

Referring to the FIG. 7, consider a scenario where the electronic device (100) captures the telephoto image (operation 702) and the wide-angle image of a ship at sea. A user may want to segment the ship from the wide-angle image of the scene. However, the wide-angle image has a larger FOV and hence the ship may appear much smaller and not clearly captured in the non-telephoto image. Here, the example is related to distance Domain (e.g., zero'th derivative) where instead of transferring a blur motion trajectory, an outline of the object is transferred.

Therefore, at operation 704, the electronic device (100) segments the ship from the telephoto image of the scene. At operation 706, the electronic device (100) downsizes the segmented ship from the telephoto image and at operation 708 the electronic device (100) transfers the segmentation to the ship in the wide-angle image.

Further, the above mentioned techniques of object segmentation may also be extended to obstruction removal in images. For example, a fence blocking an object, say a tiger. The fence in the image would appear much bigger with wires thicker and sharper in the telephoto image (additionally, using AI, camera parameters, and inter-wire distances in the two images, the auxiliary telephoto may be focused on the closer wire fence rather than on the farther tiger which the wide-angle is focused on) making it easier to accurately segment the wires and downsize for removal in the wide-angle image. Whereas, the wide-angle image would have the wires appearing very thin making it difficult to remove the same without impacting the tiger in the image. The similar technique can be applied for removing other kinds of obstructions in the images including reflections.

Therefore, the present disclosure allows the electronic device (100) to easily segment the obstruction in the images using the telephoto images, scaling it and then transferring the scaled image to the wide-angle images. Also, the present disclosure provides higher accuracy in obstruction removal from the images, when compared to conventional techniques.

Figure 8A:
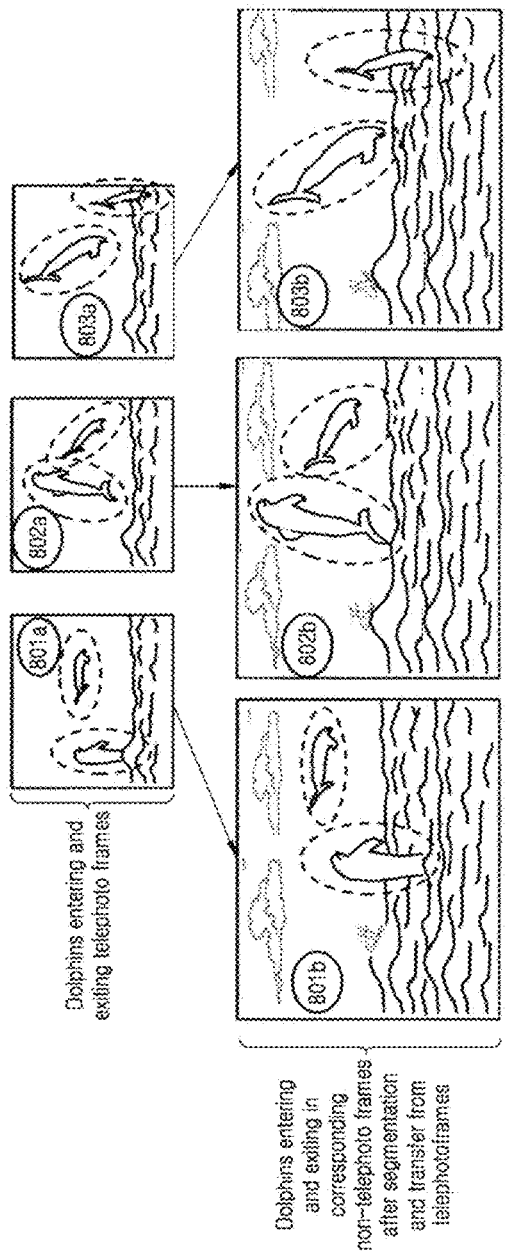
FIGS. 8A and 8B illustrate an example of a scenario of the object segmentation using the telephoto image when objects enter and exit an image frame, according to an embodiment.
Figure 8B:
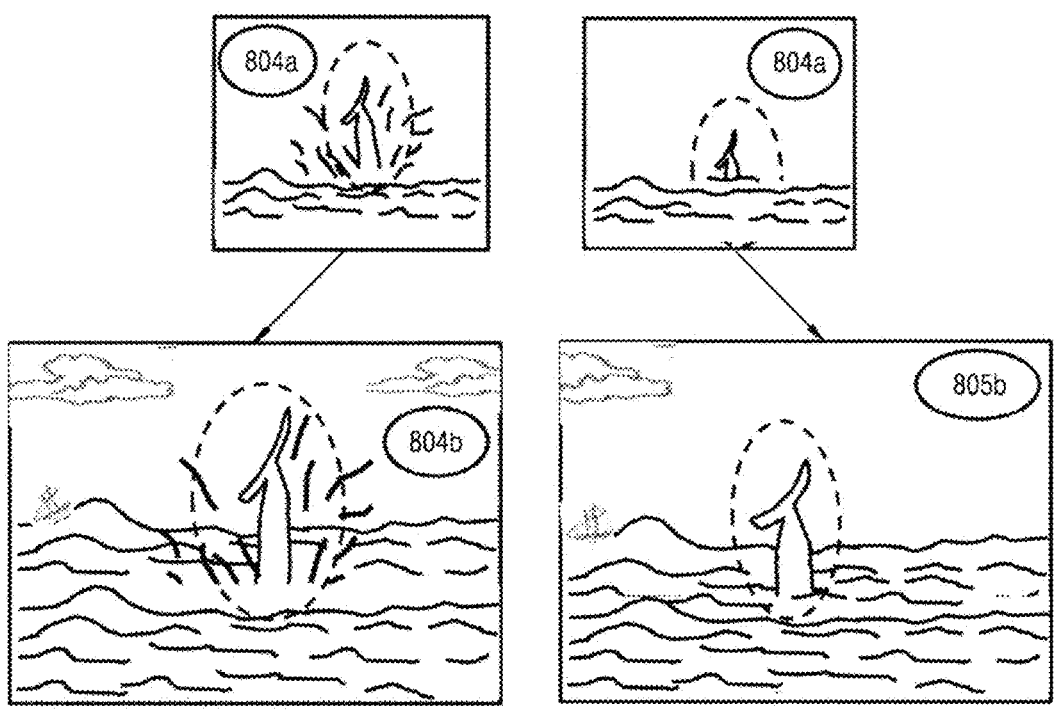

FIGS. 8A and 8B illustrate an example of a scenario of object segmentation using the telephoto image when the objects enter and exit the image frame, according to an embodiment.

Referring to the FIG. 8A, consider a scenario where the electronic device (100) is panned to capture multiple frames in a sequence of a specific event such as multiple dolphins leaping out of sea. Consider the motion characteristic is the object boundary and the motion function is the object segmentation. From operations 801a to 805a, the electronic device (100) determines multiple dolphins leaping out of the sea that enter and exit the FOV of the telephoto sensor. Further, the electronic device (100) individually detects each of the plurality of dolphins in each image frame. The electronic device (100) then segments each of the plurality of dolphins that enters the FOV of the telephoto sensor but before each of the plurality of dolphins exit the FOV of the telephoto sensor in each of the telephoto image frames. Further, the electronic device (100) determines the scale of the telephoto factor of the telephoto sensor with respect to the non-telephoto sensor and downsizes each of the segmented dolphins in each of the telephoto image frame by the scale of the telephoto factor of the telephoto sensor. The electronic device (100) then applies each of the downsized segmented dolphins from the telephoto image to the corresponding dolphins in the non-telephoto image, as shown in operations 801b to 805b.

Therefore, unlike the related art methods and systems, the present disclosure is also applicable for segmenting objects which enter and exit the FOV of the telephoto image of the electronic device (100) and then used for rectifying and enhancing the quality of the corresponding non-telephoto image.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein.

What is claimed is:

1. A method for rectifying an image using an electronic device, the method comprising:
    simultaneously capturing, by the electronic device, at least one first image of a scene using a first image sensor of a plurality of image sensors and at least one second image of the scene using a second image sensor of the plurality of image sensors, a first field of view (FOV) of the first image sensor being different from a second FOV of the second image sensor;
    identifying, by the electronic device, a motion characteristic in the at least one first image;
    determining, by the electronic device, a motion function based on one of the at least one first image and a capture process of the at least one first image that caused the motion characteristic in the at least one first image;
    scaling, by the electronic device, the motion function from the at least one first image by a scale of the first image sensor with respect to the second image sensor; and
    applying, by the electronic device, the scaled motion function onto the second FOV of the at least one second image to obtain at least one rectified second image without the motion characteristic.

2. The method as claimed in claim 1, wherein the first image sensor is a telephoto sensor,
    the second image sensor is a non-telephoto sensor,
    the first FOV of the telephoto sensor is smaller than the second FOV of the non-telephoto sensor,
    the at least one first image comprises at least one telephoto image,
    the at least one second image comprises at least one non-telephoto image,
    the simultaneously capturing the at least one first image and the at least one second image comprises preventing, by the electronic device, on-device optical image stabilization (OIS) associated with the telephoto sensor and the non-telephoto sensor during the simultaneously capturing of the at least one telephoto image and the at least one non-telephoto image, and the scaling the motion function comprises:
    determining, by the electronic device, that the motion characteristic in the at least one non-telephoto image is less than a motion threshold based on a size of the motion characteristic in the at least one telephoto image;
    determining, by the electronic device, that a first scale of the telephoto sensor with respect to the non-telephoto sensor is a downsizing scale, the first scale being a ratio of the first FOV of the telephoto sensor to the second FOV of the non-telephoto sensor, and the downsizing scale corresponding to the first scale having a value that is less than 1; and
    downsizing, by the electronic device, the motion function of the at least one telephoto image by the first scale, based on determining that the first scale is the downsizing scale.

3. The method as claimed in claim 2, wherein the motion characteristic is an image-motion-blur originating from at least one of a common shake of the electronic device, a common local motion in the scene, and a common global motion in the scene, and
    the motion function is an image-motion-trajectory.

4. The method as claimed in claim 1, wherein the first image sensor is a non-telephoto sensor,
    the second image sensor is a telephoto sensor,
    the first FOV of the non-telephoto sensor is greater than the second FOV of the telephoto sensor,
    the at least one first image comprises at least one non-telephoto image,
    the at least one second image comprises at least one telephoto image,
    the simultaneously capturing the at least one first image and the at least one second image comprises preventing, by the electronic device, on-device optical image stabilization (OIS) associated with the telephoto sensor and the non-telephoto sensor during the simultaneously capturing of the at least one telephoto image and the at least one non-telephoto image, and
    the scaling the motion function comprises:
        determining, by the electronic device, that the motion characteristic in the at least one telephoto image is greater than or equal to a motion threshold based on a size of the motion characteristic in the at least one non-telephoto image;
        estimating, by the electronic device, the motion function in a certain FOV of the at least one non-telephoto image;
        determining, by the electronic device, that a first scale of the non-telephoto sensor with respect to the telephoto sensor is an upsizing scale, the first scale being a ratio of the first FOV of the non-telephoto sensor to the second FOV of the telephoto sensor, and the upsizing scale corresponding to the first scale having a value that is greater than 1; and
        upsizing, by the electronic device, the motion function of the at least one non-telephoto image by the first scale, based on a determination that the first scale is the upsizing scale.

5. The method as claimed in claim 4, wherein the motion characteristic is an image-motion-blur which originates from a common shake of the electronic device, and
    the motion function is an image-motion-trajectory which arises from a real common motion trajectory of the electronic device due to a shake.

6. The method as claimed in claim 1, wherein the applying the scaled motion function onto the second FOV of the at least one second image comprises:
    determining, by the electronic device, a real angular motion function of the electronic device from an inertial mechanism in a first optical image stabilization (OIS) device associated with the first image sensor;
    determining, by the electronic device based on the real angular motion function, a real motion function for the second image sensor, wherein the second image sensor does not include a second OIS device; and
    applying, by the electronic device, the determined real motion function to the at least one second image to obtain the at least one rectified second image.

7. The method as claimed in claim 2, wherein the motion characteristic is a motion between two successive video frames,
    the motion function is a dense-optical-flow, and
    the applying the scaled motion function onto the second FOV of the at least one second image comprises stabilizing a portion of the second FOV of the at least one non-telephoto image which is common to the first FOV of the at least one telephoto image by applying a downsized dense-optical-flow to the at least one non-telephoto image.

8. The method as claimed in claim 2, wherein the motion characteristic is an object boundary,
    the motion function is an object segmentation, and
    the applying the scaled motion function onto the second FOV of the at least one second image comprises applying a downsized object segmentation from the at least one telephoto image to the at least one non-telephoto image to enhance pixel-level segmentation of a corresponding small object in the at least one non-telephoto image.

9. The method as claimed in claim 2, wherein the motion characteristic is curving and branching of an object in the at least one telephoto image,
    the motion function is a second or higher derivative, and
    the applying the scaled motion function onto the second FOV of the at least one second image comprises applying a downsized second or higher derivative to the at least one non-telephoto image to calculate a segmentation of a corresponding object in the at least one non-telephoto image that corresponds to the object in the at least one telephoto image.

10. The method as claimed in claim 1, wherein the simultaneously capturing the at least one first image and the at least one second image comprises:
    simultaneously switching on, by the electronic device, the first image sensor and the second image sensor of the electronic device for a specific duration of time; and
    simultaneously capturing, during the specific duration of time, by the electronic device, the at least one first image of the scene using the first image sensor and the at least one second image of the scene using the second image sensor.

11. An electronic device for rectifying an image, the electronic device comprising:
    a plurality of image sensors;
    a processor configured to:
        control a first image sensor and a second image sensor of the plurality of image sensors to simultaneously capture at least one first image of a scene using the first image sensor and at least one second image of the scene using the second image sensor, wherein a first field of view (FOV) of the first image sensor is different from a second FOV of the second image sensor; and an image rectification controller configured to:
identify a motion characteristic in the at least one first image;
determine a motion function based on one of the at least one first image and a capture process of the at least one first image that caused the motion characteristic in the at least one first image;
scale the motion function from the at least one first image by a scale of the first image sensor with respect to the second image sensor; and
apply the scaled motion function onto the second FOV of the at least one second image to obtain at least one rectified second image without the motion characteristic.

12. The electronic device as claimed in claim 11, wherein the first image sensor is a telephoto sensor;
the second image sensor is a non-telephoto sensor;
the first FOV of the telephoto sensor is smaller than the second FOV of the non-telephoto sensor;
the at least one first image comprises at least one telephoto image;
the at least one second image comprises at least one non-telephoto image; and
the image rectification controller is further configured to:
determine that the motion characteristic in the at least one non-telephoto image is less than a motion threshold based on a size of the motion characteristic in the at least one telephoto image;
prevent on-device optical image stabilization (OIS) associated with the telephoto sensor and the non-telephoto sensor during the simultaneously capturing of the at least one telephoto image and the at least one non-telephoto image;
determine that a first scale of the telephoto sensor with respect to the non-telephoto sensor is a downsizing scale, the first scale being a ratio of the first FOV of the telephoto sensor to the second FOV of the non-telephoto sensor, and the downsizing scale corresponding to the first scale having a value that is less than 1; and
downsize the motion function of the at least one telephoto image by the first scale, based on a determination that the first scale is the downsizing scale.

13. The electronic device as claimed in claim 12, wherein the motion characteristic is an image-motion-blur originating from at least one of a common shake of the electronic device, a common local motion in the scene and a common global motion in the scene, and wherein the motion function is an image-motion-trajectory.

14. The electronic device as claimed in claim 11, wherein the first image sensor is a non-telephoto sensor,
the second image sensor is a telephoto sensor,
the first FOV of the non-telephoto sensor is greater than the second FOV of the telephoto sensor,
the at least one first image comprises at least one non-telephoto image,
the at least one second image comprises at least one telephoto image, and
the image rectification controller is further configured to:
determine that the motion characteristic in the at least one telephoto image is greater than or equal to a motion threshold based on a size of the motion characteristic in the at least one non-telephoto image;
prevent on-device optical image stabilization (OIS) associated with the telephoto sensor and the non-telephoto sensor during the simultaneously capturing of the at least one telephoto image and the at least one non-telephoto image;
estimate the motion function in a certain FOV of the at least one non-telephoto image;
determine that a first scale of the non-telephoto sensor with respect to the telephoto sensor is an upsizing scale, the first scale being a ratio of the first FOV of the non-telephoto sensor to the second FOV of the telephoto sensor, and the upsizing scale corresponding to the first scale having a value that is greater than 1; and
upsize the motion function of the at least one non-telephoto image by the first scale, based on a determination that the first scale is the upsizing scale.

15. The electronic device as claimed in claim 14, wherein the motion characteristic is an image-motion-blur which originates from a common shake of the electronic device, and wherein the motion function is an image-motion-trajectory that arises from a real common motion trajectory of the electronic device due to a shake.

16. The electronic device as claimed in claim 11, wherein the image rectification controller is further configured to:
determine a real angular motion function of the electronic device based on an inertial mechanism in a first optical image stabilization (OIS) device associated with the first image sensor;
determine, based on the real angular motion function, a real motion function for the second image sensor, wherein the second image sensor does not include a second OIS device; and
apply the determined real motion function to the at least one second image to obtain the at least one rectified second image.

17. The electronic device as claimed in claim 15, wherein the motion characteristic is a motion between two successive video frames,
the motion function is a dense-optical-flow, and
the image rectification controller is further configured to stabilize a portion of the second FOV of the at least one non-telephoto image which is common to the first FOV of the at least one telephoto image by applying a downsized dense-optical-flow to the at least one non-telephoto image.

18. The electronic device as claimed in claim 12, wherein the motion characteristic is an object boundary,
the motion function is an object segmentation, and
the image rectification controller is further configured to apply a downsized object segmentation from the at least one telephoto image to the at least one non-telephoto image to enhance pixel-level segmentation of a corresponding small object in the at least one non-telephoto image.

19. The electronic device as claimed in claim 11, wherein the plurality of image sensors are further configured to:
simultaneously switch on the first image sensor and the second image sensor of the electronic device for a specific duration of time; and
simultaneously capture, during the specific duration of time, the at least one first image of the scene using the first image sensor and the at least one second image of the scene using the second image sensor.

20. A non-transitory computer-readable storage medium, having a computer program stored thereon that performs, when executed by a processor, the method according to of claim 1.

\* \* \* \* \*